United States Patent
Lambert

(10) Patent No.: US 11,047,600 B1
(45) Date of Patent: Jun. 29, 2021

(54) SOLAR PANEL OPTIMIZATION APPARATUS

(71) Applicant: Joel Lambert, Trona, CA (US)

(72) Inventor: Joel Lambert, Trona, CA (US)

( * ) Notice: Subject to any disclaimer, the term of this patent is extended or adjusted under 35 U.S.C. 154(b) by 182 days.

(21) Appl. No.: 15/451,648

(22) Filed: Mar. 7, 2017

(51) Int. Cl.
*F24S 50/20* (2018.01)
*F24S 23/30* (2018.01)
*F24S 25/00* (2018.01)

(52) U.S. Cl.
CPC ............. *F24S 50/20* (2018.05); *F24S 23/30* (2018.05); *F24S 25/00* (2018.05)

(58) Field of Classification Search
CPC .................................. F24S 23/30; F24S 23/31
USPC ............................................ 126/698; 136/246
See application file for complete search history.

(56) References Cited

U.S. PATENT DOCUMENTS

| | | | | |
|---|---|---|---|---|
| 4,566,434 A * | 1/1986 | Lindenbauer | ......... | F24S 30/455 126/577 |
| 8,171,928 B2 | 5/2012 | Glynn | | |
| 2003/0121514 A1 * | 7/2003 | Davenport | .............. | F24S 50/00 126/570 |
| 2008/0000515 A1 * | 1/2008 | Lin | .......... | H02S 40/38 136/246 |
| 2009/0126718 A1 | 5/2009 | Gelber et al. | | |
| 2011/0253214 A1 * | 10/2011 | Chung | .................. | H02S 20/00 136/259 |
| 2012/0260906 A1 | 10/2012 | Baeten | | |
| 2016/0071993 A1 * | 3/2016 | McLain | .............. | H01L 31/0543 136/246 |

\* cited by examiner

*Primary Examiner* — Steven B McAllister
*Assistant Examiner* — Aaron H Heyamoto
(74) *Attorney, Agent, or Firm* — Makoui Law, PC; Ali Makoui

(57) ABSTRACT

A solar panel optimization apparatus including a magnifying glass and a plurality of hydraulic legs attached to a rear surface of the magnifying glass. A control housing is also attached to the rear surface of the magnifying glass. A central processing unit having a light tracking system is disposed within the control housing. A solar panel has an adjustable support frame and an upper surface attached to a bottom end of each of the plurality of hydraulic legs. The light tracking system of the central processing unit is configured to selectively adjust the plurality of hydraulic legs in order to maximize the intensity of light disposed on the magnifying glass.

5 Claims, 6 Drawing Sheets

SOLAR PANEL OPTIMIZATION APPARATUS

BACKGROUND OF THE INVENTION

Various types of solar panels are known in the prior art. However, what has been needed is a solar panel optimization apparatus including a magnifying glass and a plurality of hydraulic legs attached to a rear surface of the magnifying glass. What has been further needed is a control housing also attached to the rear surface of the magnifying glass, a central processing unit having a light tracking system disposed within the control housing, and a solar panel having an adjustable support frame and an upper surface attached to a bottom end of each of the plurality of hydraulic legs. Lastly, what has been needed is for the light tracking system of the central processing unit to be configured to selectively adjust the plurality of hydraulic legs in order to maximize the intensity of light disposed on the magnifying glass. The solar panel optimization apparatus is thus uniquely structured to maximize the intensity of light being directed toward the solar panel in order to optimize the efficiency of the solar panel.

FIELD OF THE INVENTION

The present invention relates to solar panels, and more particularly, to a solar panel optimization apparatus.

SUMMARY OF THE INVENTION

The general purpose of the present solar panel optimization apparatus, described subsequently in greater detail, is to provide a solar panel optimization apparatus which has many novel features that result in a solar panel optimization apparatus which is not anticipated, rendered obvious, suggested, or even implied by prior art, either alone or in combination thereof.

To accomplish this, the present solar panel optimization apparatus includes a magnifying glass having a convexly curved front surface, a convexly curved rear surface, a right surface, a left surface, a top surface, a bottom surface, a right upper corner, a left upper corner, a right bottom corner, and a left bottom corner. A plurality of hydraulic legs includes a right upper hydraulic leg, a left upper hydraulic leg, a right lower hydraulic leg, and a left lower hydraulic leg. Each of the right upper hydraulic leg, the left upper hydraulic leg, the right lower hydraulic leg, and the left lower hydraulic leg has a top end attached to the convexly curved rear surface of the magnifying glass proximal each of the right upper corner, the left upper corner, the right bottom corner, and the left bottom corner, respectively.

The solar panel optimization apparatus further includes a control housing attached to the convexly curved rear surface of the magnifying glass. A central processing unit is disposed within the control housing, with the central processing unit having a light tracking system. A battery compartment is also disposed within the control housing, with a battery disposed within the battery compartment of the control housing. Each of the plurality of hydraulic legs, the central processing unit, and the battery are in operational communication with each other.

A solar panel has a lower surface, an adjustable support frame attached to the lower surface, and an upper surface attached to a bottom end of each of the right upper hydraulic leg, the left upper hydraulic leg, the right lower hydraulic leg, and the left lower hydraulic leg of the plurality of hydraulic legs. A length of the magnifying glass substantially conforms to a length of the solar panel so that magnifying glass fully covers the solar panel. The light tracking system of the central processing unit is configured to selectively adjust the plurality of hydraulic legs in order to maximize the intensity of light disposed on the magnifying glass. The solar panel optimization apparatus thus helps to maximize the intensity of light directed onto a solar panel in order to optimize the efficiency of the solar panel. It is also envisioned that the apparatus can be mountable to an existing solar panel.

Thus has been broadly outlined the more important features of the present solar panel optimization apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
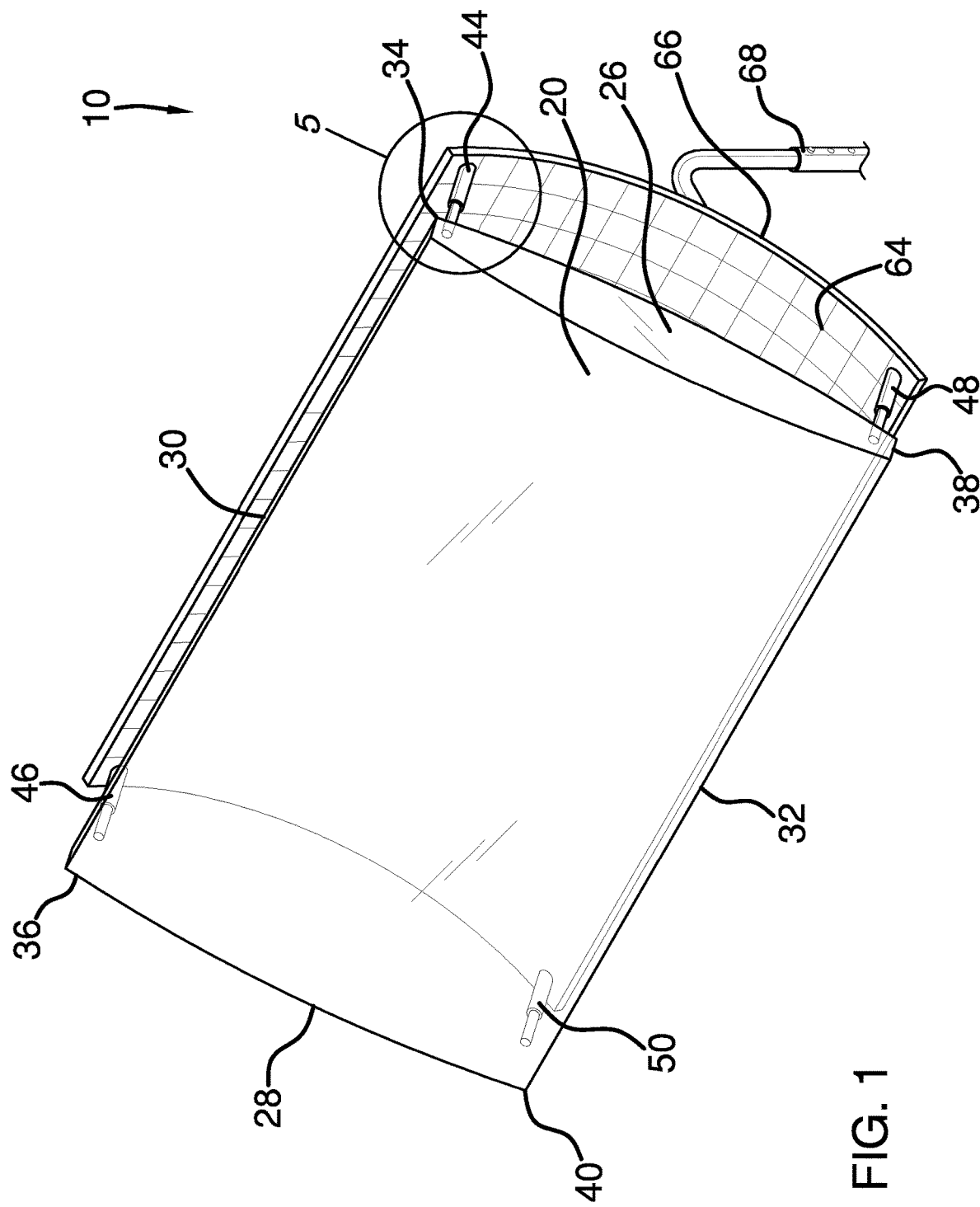
FIG. 1 is a front isometric view.
Figure 2:
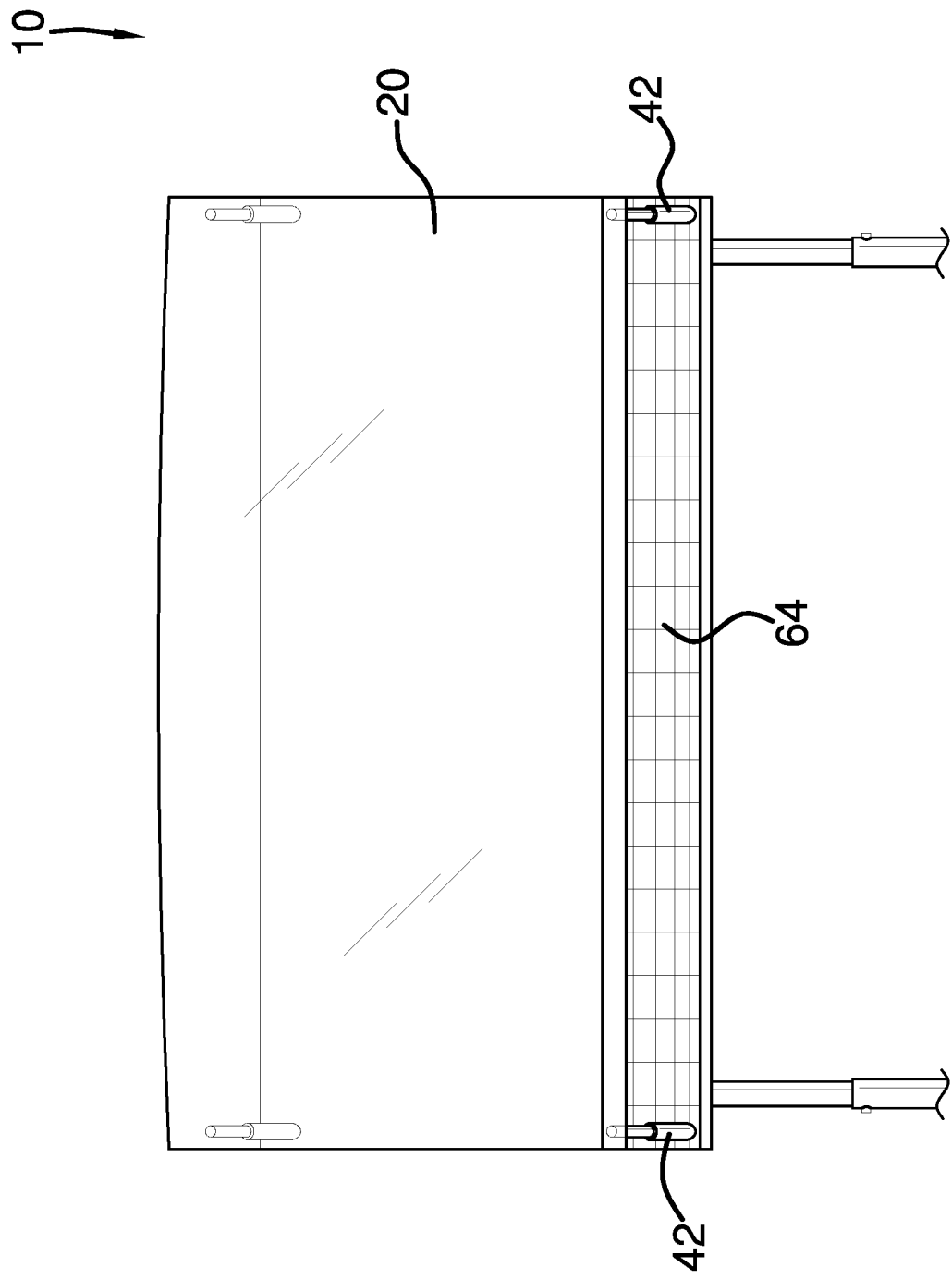
FIG. 2 is a front elevation view.
Figure 3:
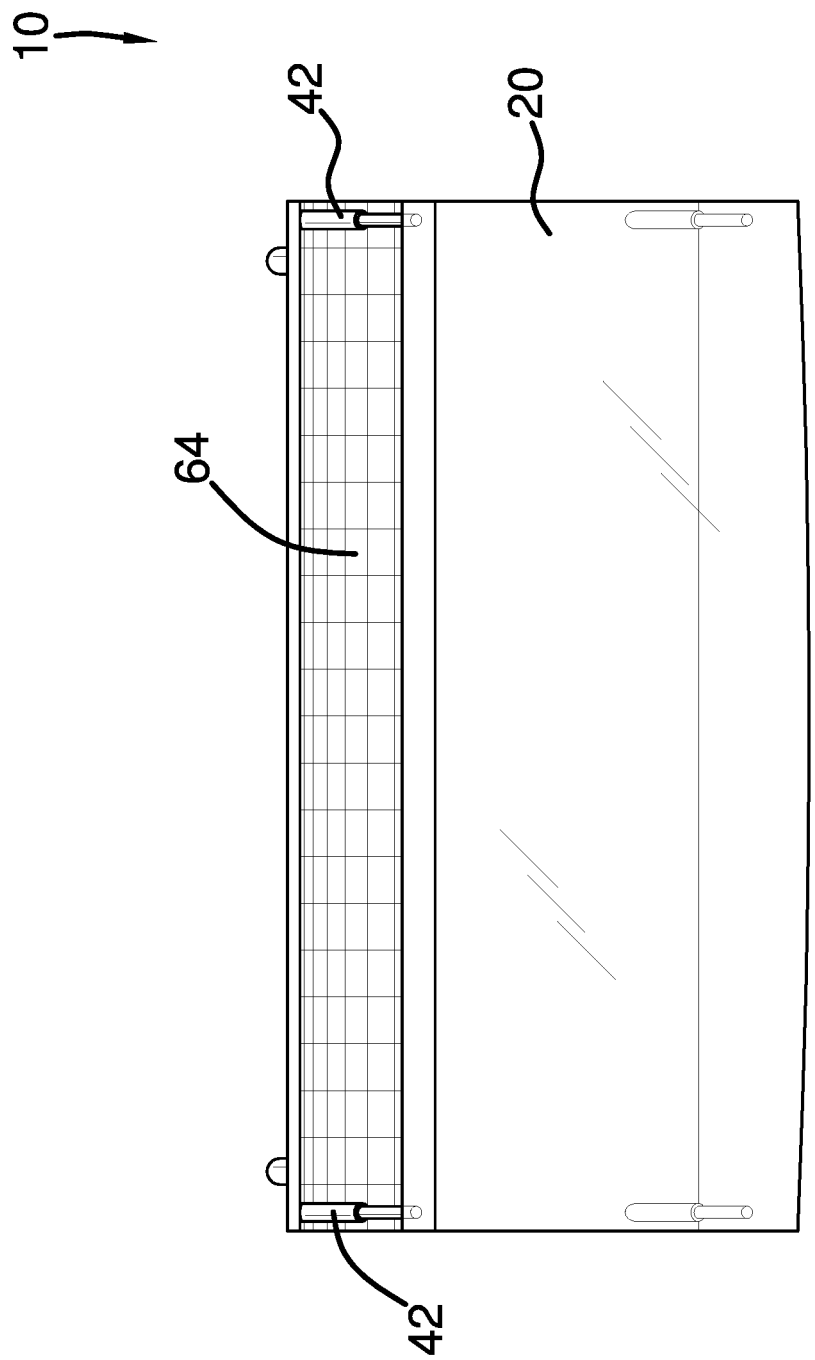
FIG. 3 is a top plan view.
Figure 4:
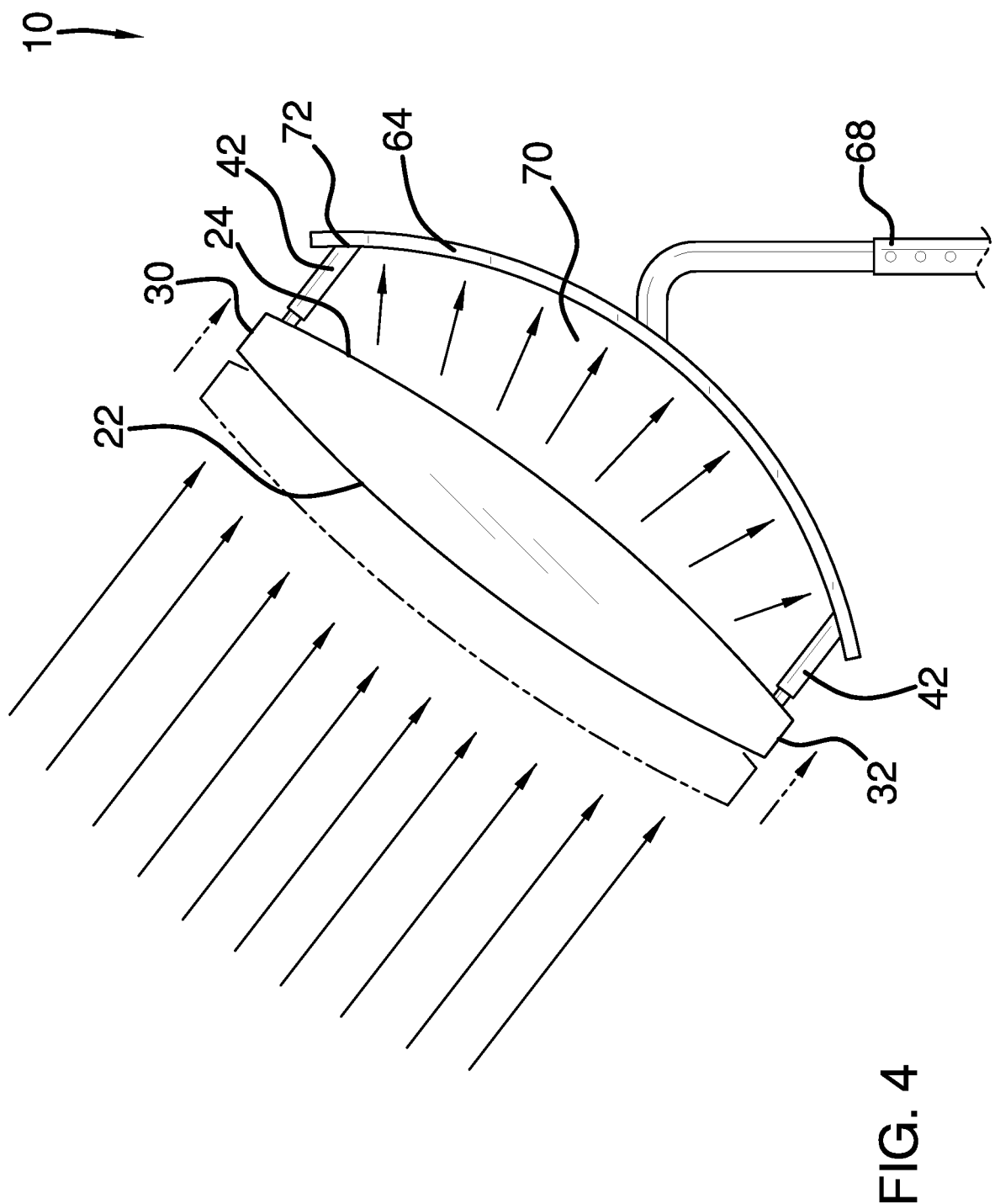
FIG. 4 is a side elevation view.
Figure 5:
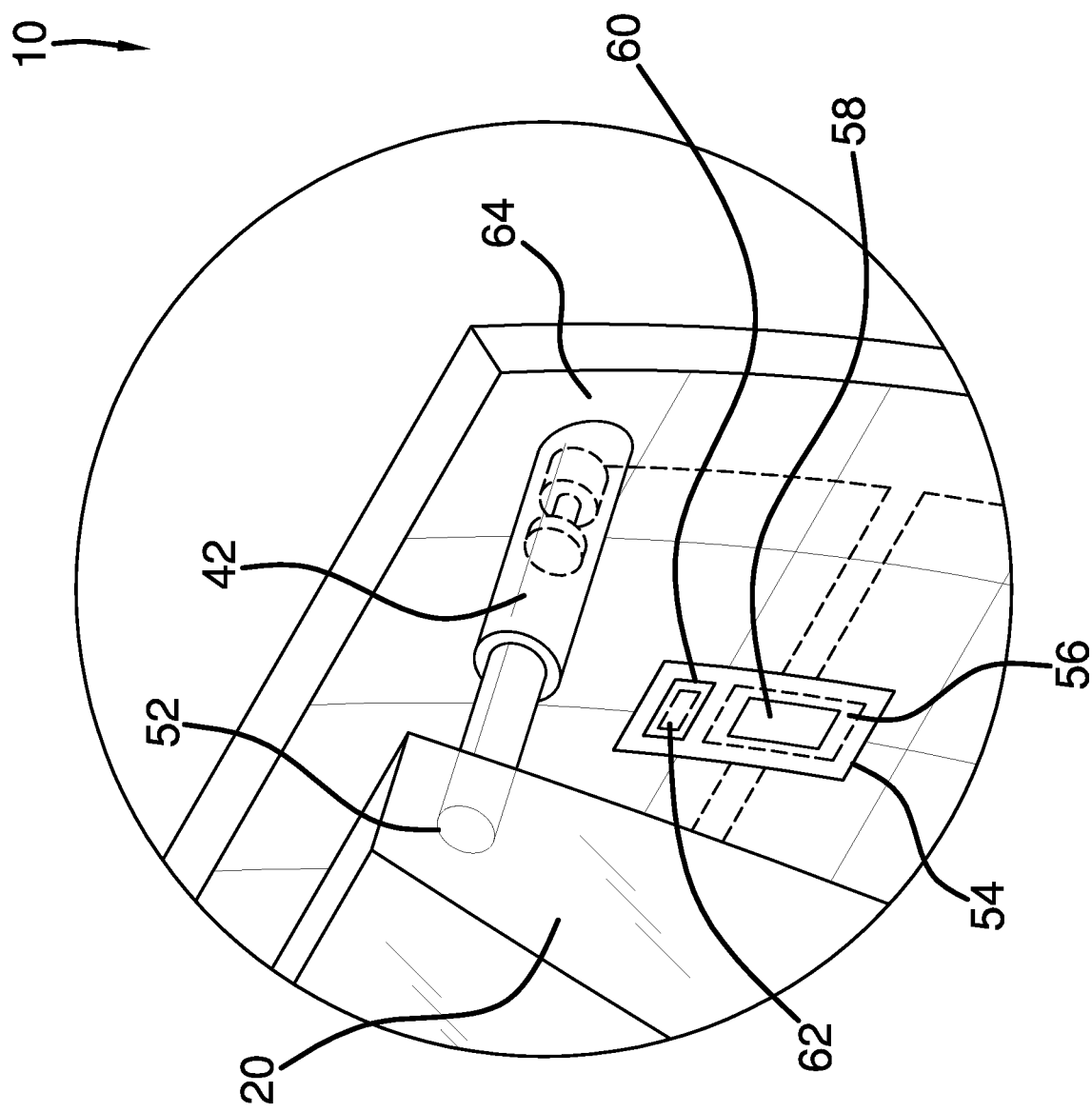
FIG. 5 is a detail view.
Figure 6:
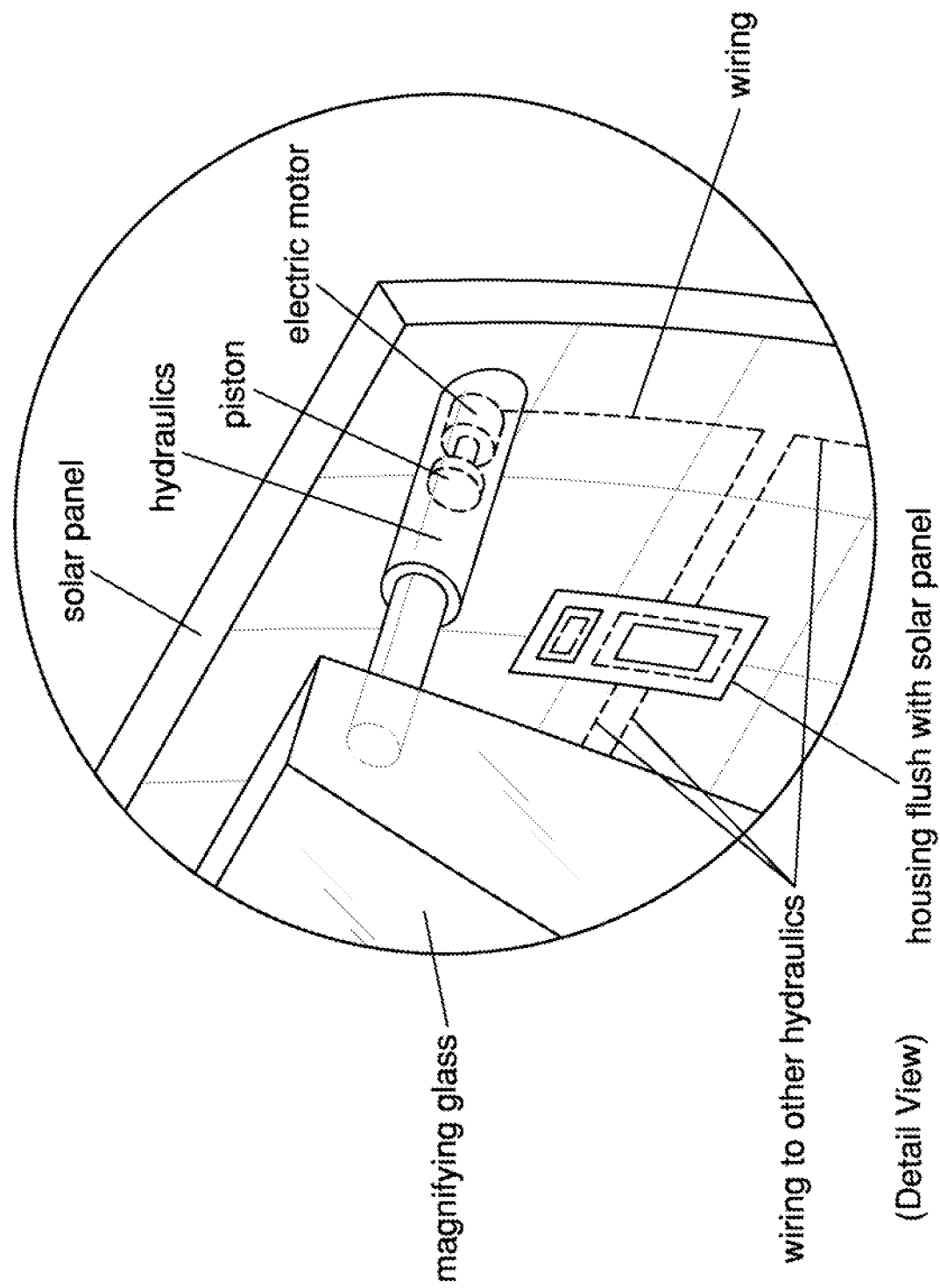
FIG. 6 is detail view.

With reference now to the drawings, and in particular FIGS. 1 through 5 thereof, an example of the instant solar panel optimization apparatus employing the principles and concepts of the present solar panel optimization apparatus and generally designated by the reference number 10 will be described.

Referring to FIGS. 1 through 5 the present solar panel optimization apparatus 10 is illustrated. The solar panel optimization apparatus 10 includes a magnifying glass 20 having a convexly curved front surface 22, a convexly curved rear surface 24, a right surface 26, a left surface 28, a top surface 30, a bottom surface 32, a right upper corner 34, a left upper corner 36, a right bottom corner 38, and a left bottom corner 40. A plurality of hydraulic legs 42 includes a right upper hydraulic leg 44, a left upper hydraulic leg 46, a right lower hydraulic leg 48, and a left lower hydraulic leg 50. Each of the right upper hydraulic leg 44, the left upper hydraulic leg 46, the right lower hydraulic leg 48, and the left lower hydraulic leg 50 has a top end 52 attached to the convexly curved rear surface 24 of the magnifying glass 20 proximal each of the right upper corner 34, the left upper corner 36, the right bottom corner 38, and the left bottom corner 40, respectively.

The solar panel optimization apparatus 10 further includes a control housing 54 attached to the convexly curved rear surface 24 of the magnifying glass 20. A central processing unit 56 is disposed within the control housing 54, with the central processing unit 56 having a light tracking system 58. A battery compartment 60 is also disposed within the control housing 54, with a battery 62 disposed within the battery compartment 60 of the control housing 54. Each of the plurality of hydraulic legs 42, the central processing unit 56, and the battery 62 are in operational communication with each other.

A solar panel 64 has a lower surface 66, an adjustable support frame 68 attached to the lower surface 66, and an upper surface 70 attached to a bottom end 72 of each of the right upper hydraulic leg 44, the left upper hydraulic leg 46, the right lower hydraulic leg 48, and the left lower hydraulic leg 50 of the plurality of hydraulic legs 42.

What is claimed is:

1. A solar panel optimization apparatus comprising:
   a magnifying glass having a convexly curved front surface and a convexly curved rear surface;
   a central processing unit having a light tracking system; and
   a solar panel having a convexly curved lower surface, and a concavely curved upper surface;
   a plurality of hydraulic legs, wherein each hydraulic leg comprises a thinner cylindrical part, a wider cylindrical part, an electric motor, and a piston connected to the electric motor, wherein the thinner cylindrical part is directly connected to the magnifying glass and fits within the wider cylindrical part, and wherein the wider cylindrical part is directly connected to the solar panel;
   wherein a length and a width of the convexly curved rear surface of the magnifying glass substantially conforms to a length and a width of the concavely curved upper surface of the solar panel such that the magnifying glass fully covers the solar panel;
   wherein the central processing unit is in operational communication with each of the plurality of hydraulic legs; and
   wherein the light tracking system of the central processing unit is configured to selectively adjust the plurality of hydraulic legs in order to maximize an intensity of light disposed on the magnifying glass.

2. The solar panel optimization apparatus of claim 1 further comprising a battery in operational communication with the central processing unit and the plurality of hydraulic legs.

3. The solar panel optimization apparatus of claim 2 further comprising a control housing attached to the convexly curved rear surface of the magnifying glass;
   wherein the central processing unit and the battery are disposed within the control housing.

4. The solar panel optimization apparatus of claim 3 further comprising a battery compartment disposed within the control housing, wherein the battery is disposed within the battery compartment.

5. The solar panel optimization apparatus of claim 1, wherein the solar panel further comprises an adjustable support frame attached to the lower surface of the solar panel.

* * * * *